US008662576B2

(12) United States Patent
Lösch et al.

(10) Patent No.: US 8,662,576 B2
(45) Date of Patent: Mar. 4, 2014

(54) BODY FOR A MOTOR VEHICLE AND METHOD FOR PRODUCING A MOTOR VEHICLE BODY

(75) Inventors: Alfred Lösch, Tholey (DE); Helmut Mebus, Burscheid (DE); Axel Grüneklee, Duisburg (DE); Joachim Quandt, Borken (DE); Clemens Latuske, Düsseldorf (DE)

(73) Assignee: ThyssenKrupp Steel Europe AG, Duisburg (DE)

( * ) Notice: Subject to any disclaimer, the term of this patent is extended or adjusted under 35 U.S.C. 154(b) by 0 days.

(21) Appl. No.: 13/156,118

(22) Filed: Jun. 8, 2011

(65) Prior Publication Data

US 2011/0266837 A1 Nov. 3, 2011

Related U.S. Application Data

(63) Continuation of application No. PCT/EP2009/066772, filed on Dec. 9, 2009.

(30) Foreign Application Priority Data

Dec. 10, 2008 (DE) .................... 10 2008 061 490

(51) Int. Cl.
*B62D 27/02* (2006.01)
*F16B 9/00* (2006.01)

(52) U.S. Cl.
USPC ......... 296/210; 296/30; 296/193.06; 403/205

(58) Field of Classification Search
USPC ............... 52/280; 296/29, 30, 185.1, 193.06, 296/193.12, 203.03, 210, 203.01; 403/188, 403/192, 205, 263, 408.1
See application file for complete search history.

(56) References Cited

U.S. PATENT DOCUMENTS 2,327,585 A * 8/1943 Ulrich .......................... 52/787.1
3,787,130 A * 1/1974 Hemmings et al. ........... 403/205
(Continued)

FOREIGN PATENT DOCUMENTS

DE 19915546 A1 10/2000
DE 60103801 T2 7/2005
(Continued)

*Primary Examiner* — Glenn Dayoan
*Assistant Examiner* — Paul Chenevert
(74) *Attorney, Agent, or Firm* — Reinhart Boerner Van Deuren P.C.

(57) ABSTRACT

A body for a motor vehicle and a method for producing a motor vehicle body is provided. Such a body comprises two roof frame longitudinal profiles (6, 14), at least one roof frame cross profile (10) arranged between the roof frame longitudinal profiles (6, 14) and a body pillar (12), wherein in a connecting area (Y) a roof frame longitudinal profile (6; 14), a roof frame cross profile (10) and the body pillar (12) are connected or can be connected together using a mechanical connection. Here the roof frame longitudinal profile (6; 14) comprises a recess (16) in the connecting area (Y), as seen in a longitudinal section of the roof frame longitudinal profile (6; 14), the recess accommodating the roof frame cross profile (10), at least some areas of the circumferential contour of the profile being adapted to match the recess (16). At least parts of the mechanical connection of the roof frame cross profile (10) to the body pillar (12) are disposed in the recess (16) and are designed such that the two opposing side walls of the recess (16) are supported against each another.

13 Claims, 4 Drawing Sheets

(56) References Cited

U.S. PATENT DOCUMENTS

| | | | |
|---|---|---|---|
| 5,040,917 A * | 8/1991 | Camuffo | 403/408.1 |
| 5,226,696 A * | 7/1993 | Klages et al. | 296/203.01 |
| 5,259,660 A * | 11/1993 | Haesters | 296/204 |
| 5,318,338 A * | 6/1994 | Ikeda | 296/210 |
| 5,333,554 A * | 8/1994 | Yamada et al. | 105/397 |
| 5,593,245 A * | 1/1997 | Herz et al. | 403/403 |
| 5,609,386 A * | 3/1997 | Takahashi et al. | 296/204 |
| 5,681,076 A * | 10/1997 | Yoshii | 296/210 |
| 5,873,618 A * | 2/1999 | Ejima | 296/30 |
| 6,053,564 A * | 4/2000 | Kamata et al. | 296/187.09 |
| 6,237,304 B1 * | 5/2001 | Wycech | 52/847 |
| 6,269,902 B1 * | 8/2001 | Miyagawa | 180/312 |
| 6,502,874 B2 * | 1/2003 | Kajiwara et al. | 293/133 |
| 7,121,615 B2 * | 10/2006 | Hoshino | 296/203.03 |
| 7,407,222 B2 | 8/2008 | Anderson et al. | |
| 7,445,269 B2 * | 11/2008 | Yustick et al. | 296/187.01 |
| 7,488,023 B2 * | 2/2009 | Kapadia et al. | 296/29 |
| 7,510,234 B2 * | 3/2009 | Ameloot et al. | 296/187.12 |
| 7,527,850 B2 * | 5/2009 | Muto et al. | 428/136 |
| 7,543,884 B2 * | 6/2009 | Reed et al. | 296/210 |
| 7,631,918 B2 * | 12/2009 | Yasukouchi et al. | 296/30 |
| 7,686,387 B2 * | 3/2010 | Yustick et al. | 296/205 |
| 7,726,718 B2 * | 6/2010 | Weirup | 296/30 |
| 7,854,474 B2 * | 12/2010 | Cox | 296/204 |
| 8,029,008 B2 * | 10/2011 | Cortez et al. | 280/124.175 |
| 8,123,286 B2 * | 2/2012 | Furusako et al. | 296/203.03 |
| 8,366,150 B2 * | 2/2013 | Parsons et al. | 280/797 |
| 2004/0090087 A1 * | 5/2004 | Kimura | 296/203.03 |
| 2006/0202518 A1 * | 9/2006 | Osterberg et al. | 296/193.12 |
| 2008/0224500 A1 | 9/2008 | Patberg et al. | |
| 2011/0020058 A1 * | 1/2011 | Briosi | 403/205 |

FOREIGN PATENT DOCUMENTS

| | | | |
|---|---|---|---|
| DE | 60018354 T2 | 1/2006 | |
| DE | 60109352 T2 | 4/2006 | |
| DE | 102005044066 A1 | 4/2007 | |
| DE | 102005047927 A1 | 4/2007 | |
| EP | 1462344 A2 | 9/2004 | |
| EP | 1764287 A2 | 3/2007 | |
| FR | 2887217 A1 | 12/2006 | |
| JP | 58136566 A * | 8/1983 | B62D 25/04 |
| JP | 09-076937 A | 3/1997 | |

* cited by examiner

BODY FOR A MOTOR VEHICLE AND METHOD FOR PRODUCING A MOTOR VEHICLE BODY

CROSS-REFERENCE TO RELATED PATENT APPLICATIONS

This patent application is a continuation of co-pending PCT Application No. PCT/EP2009/066772, filed Dec. 9, 2009, which claims the benefit of German Application No. 10 2008 061 490.4, filed Dec. 10, 2008, the entire teachings and disclosure of which are incorporated herein by reference thereto.

FIELD OF THE INVENTION

The invention relates to a body for a motor vehicle and a method for producing a body for a motor vehicle.

Such a body is preferably a body with an at least in part modular design, in which a first body element is mechanically connected to a second body element in a predetermined connection area using additional connecting means. Here the first body element is for example designed in the form of a prefabricated roof module or at least as a cross profile of a roof and the second body element as a body pillar—in particular in the form of a so-called B-pillar or as a body side part with integrated body or B-pillar. In order to connect the two body elements the roof module or the cross profile is secured to the body pillar by separate connecting means.

BACKGROUND OF THE INVENTION

From the state of the art connections are known in which the roof or the roof cross profile (transverse profile) is designed as a single part with a body side part having a body pillar (DE 10 2005 047 927 A1) or connections in which the cross profile and the B-pillar are welded together.

From DE 601 03 801 T2 a method is known for the assembly of an automobile body structure in which two body elements—in the form of a body side element with body pillar and a body superstructure with roof structure and front and rear window area—are joined together. Here the two parts are positioned to one another and then welded together. In order that the two body elements are optimally positioned in relation to each other prior to the welding process, the body side part has in the head end area of the B-pillar a centring opening which cooperates with a positioning pin secured to the roof structure and correlating with the centring opening.

From DE 601 09 352 T2 a body subassembly is also known in which a frame pillar profile and a roof front cross profile are welded together using a separate wedge.

In DE 10 2005 044 066 A1 a body pillar is described in which in the roof-end area retaining lugs are formed to accommodate a roof frame profile. Here the roof frame profile is positioned on the retaining lugs from above and then welded in the area of the retaining lugs to the body pillar.

Finally from DE 600 18 354 T2 a roof structure for a motor vehicle is known, wherein the motor vehicle has a roof opening, which can be opened and closed by a so-called covering member (e.g. a folding roof). The roof structure comprises a frame member to be joined in the roof opening, which is arranged on the roof in such a way as to frame the roof opening and support or carry the covering member. Here the frame member has a reinforcing cross profile in the widthways direction of the motor vehicle. Furthermore in the area of the cross profile reinforcement is provided via which the cross profile can be screwed to the B-pillar of the vehicle.

From DE 196 15 546 A1 a structure for the upper body section of a motor vehicle body is known, wherein a cross profile referred to as a roof reinforcing member is arranged between the B-pillars of a body basic structure referred to as central posts with the incorporation of a corner piece to provide the body with rigidity.

In DE 199 15 546 A1 a roof construction for a vehicle fitted with roof railing is indicated, wherein in the connection area between the body pillar and the roof cross profile, in which likewise a fixing point for the roof railing is provided, a mounting bracket for reinforcing the body in this area is provided.

U.S. Pat. No. 7,407,222 B2 likewise describes a motor vehicle body, in which in the connection area between the roof cross profile and the body pillar an additional bracket-shaped connecting and reinforcing element is provided.

Further body strengthening design details are known from FR 2 887 217 A1 and EP 1 462 344 A2.

SUMMARY OF THE INVENTION

The object of the invention is to provide a body for a motor vehicle and a method for producing a motor vehicle, wherein or whereby the weight of a vehicle body can be further reduced, whilst maintaining or improving the crash safety. The invention should in particular allow the connection of body elements made from light metal (with a modulus of elasticity less than steel) with body elements made from steel.

This object is achieved according to one embodiment of the invention by a body with the features of one independent claim and by a method for producing a body with the features of another independent claim, respectively. Advantageous further developments of the invention result from the respective sub-claims.

Vehicle bodies are today produced in the most varied of ways. The central point of the present invention is the at least in part mechanically designed connection of the roof frame longitudinal profiles forming the roof frame with a roof frame cross profile of the roof frame on the one hand and with a body pillar or a body part containing the body pillar on the other. In the following description the roof frame cross profile or a roof frame module with a corresponding roof frame cross profile is also referred to as a first body element and the body pillar or a body part with integrated body pillar is also referred to as a second body element.

For the mechanically designed connection between the first and second body element the roof frame or the roof frame longitudinal profile, in the area of a predetermined connection point, has an substantially U-shaped recess, as seen in a longitudinal section of the longitudinal roof frame section, for accommodating at least in part the roof frame cross profile. Here in the recess a connecting means or at least a component of such is arranged or can be arranged, which is designed so that both side walls of the recess, formed by the roof frame profiles (roof frame longitudinal profile and roof frame cross profile), advantageously with a shell construction and which in the area of the connecting point overlap for at least part of this area, are supported against each other. The connecting means advantageously has a multi-part design, wherein, for the purposes of connecting the roof frame profile to the body pillar, a first connecting element is arranged within the recess and a second connecting element is arranged opposite the first connecting element, supported from below or from the outside on the floor of the recess formed by the metal sheets of the roof frame (roof frame longitudinal profile and roof frame cross profile).

Here the second connecting element can either be arranged on the roof frame in the course of pre-assembly incorporating the roof frame profiles to be connected, so that then the roof frame module or the two roof frame profiles are secured to the body pillar (in particular B-pillar) (e.g. by means of the connecting element screwed and/or welded to this).

In a preferred embodiment of the invention, the second connecting element is not already connected to the roof frame profiles in the course of pre-assembly, however, but is secured directly to the body pillar or the body part forming the body pillar—in particular is welded to this. Then the first body element, in which within the recess the first connecting element is secured or pre-positioned, for example by gluing or welding, can be connected to the second body element, inasmuch as the roof frame is joined mechanically by screwing of the first and second connecting element to the body structure. For the screwed connection both connecting elements and also the first body element in the area of the floor of the recess have drill holes correlating with each other.

The support to be achieved by the connecting means is achieved by a support element, which can be a component of the first connecting element arranged in the recess. For example, the first connecting element can have a plate-like floor to be arranged on the floor-side in the recess and provided with one or more drills, and an integrated support element, wherein the support element at least in a partial area is distanced from the floor of the recess and rests (or almost rests) against the side walls of the recess. Advantageously the support element is designed as a thickened material section of any cross-section of a connecting element arm extending from the floor of the recess into the inside of the recess.

In a particularly preferred embodiment of the invention the roof frame profiles have a shell construction design. Advantageously the second connecting element on the floor-side also has a shell construction design matched to the roof frame profiles which in the area of the recess overlap for at least part of this area, so that it encloses the overlapping roof frame profiles also, at least in part, laterally from the outside. Here the second connecting element is already connected to the body pillar in the course of pre-assembly—preferably welded to this. Advantageously the support element of the first connecting element on each of its two front faces has a drill hole for accommodating a securing means in particular with a screw design, wherein the drill holes in the support element correlate with drill holes in the side walls of the roof frame profiles lying on top of one another in this area and with drill holes in the side walls of the second connecting element with a shell construction design. By means of the mechanical connection created by the connecting means with support function, an extremely stable construction is achieved. If the roof module is mechanically joined to the roof structure in the area of the body pillars, the other areas, in which the roof module rests on the body structure can be welded and/or glued together.

In a particularly preferred embodiment of a design of the invention, the first body element is designed as a magnesium or magnesium alloy component. The roof frame longitudinal profiles can be designed either as a component of a separate roof module that can be pre-assembled or as a component of other body parts such as the body side parts.

A separate roof or roof frame module comprises substantially two roof frame longitudinal profiles forming the external roof frame and two external roof frame cross profiles and at least one further roof frame cross profile arranged between the two roof frame cross profiles in the area of a body pillar. In this case the roof frame longitudinal profiles are advantageously likewise made up of components made of magnesium or a magnesium alloy.

Alternatively or additionally the roof frame longitudinal profiles can also be designed as an integral component of a body (other than the roof) part (e.g. a body side part). In this case the (body-side) roof frame longitudinal profiles are made from steel. Instead of magnesium or a magnesium alloy another light metal or another light metal alloy can also be used—in any event a light metal must be used which has a lower modulus of elasticity than steel (in particular a light metal with a lower modulus of elasticity than the steel from which the body pillar is made). A conceivable alternative to magnesium is, for example, the light metal aluminium.

Through the mechanical connection according to embodiments of the invention of roof frame profiles and body pillar, with a simultaneous and significant reduction in the weight (through the use of light metal profiles in the area of the roof construction) the necessary stability of the body with regard to crash safety can be achieved and maintained. With the use of conventional roof profiles in steel, the crash safety can be considerably increased whilst maintaining the body weight.

BRIEF DESCRIPTION OF THE DRAWINGS

Further advantages, special features and expedient further developments of the invention can be seen from the sub-claims and the following drawings of preferred exemplary embodiments. These show as follows:

DETAILED DESCRIPTION OF THE INVENTION

Figure 1:
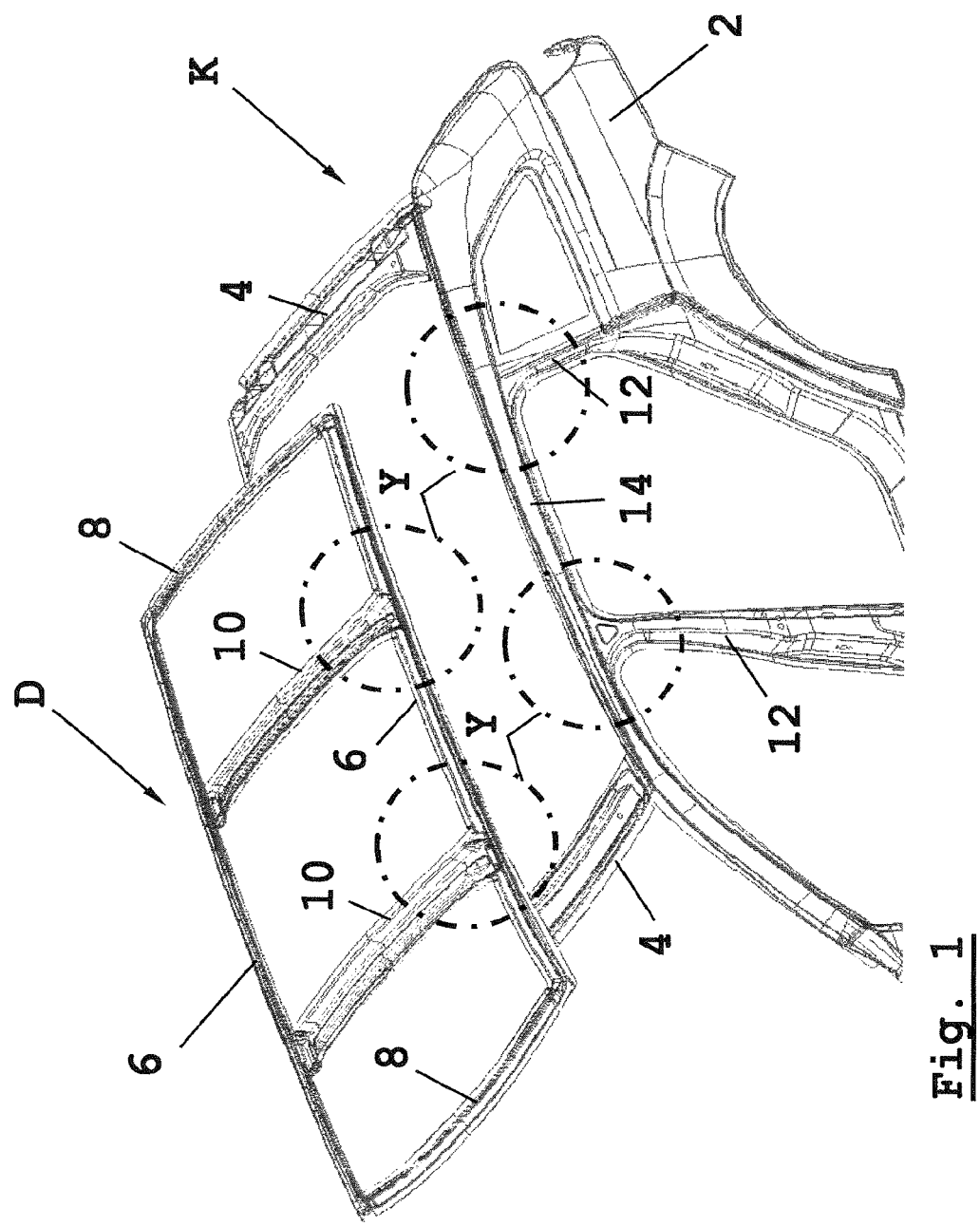
FIG. 1 is a partial representation of a motor vehicle body.

FIG. 1 shows a vehicle body framework K, preferably consisting of steel, comprising a first body element 2 consisting of a body side wall 2, on which in the roof-side area both at the front and back a body cross profile 4 is arranged for accommodating a roof module D. The roof module D forming a second body element substantially consists of a roof frame with two lengthwise roof frame longitudinal profiles 6 and a front and a rear roof frame cross profile 8 and two further roof frame cross profiles 10 arranged between the frame-side roof frame cross profiles 8. In order to join the roof frame module D to the body structure K, in the area of connection points Y, in which the roof frame module is to be mechanically connected to its roof frame cross profiles 10 enclosing the roof frame longitudinal profiles with the body pillars 12 of the body side section, additional separate connecting means 20 are provided. The pre-assembled roof module D is positioned on the body structure K and by means of the separate connecting means 20 in the area of the connection points Y is mechanically joined to the body or the body structure. Advantageously the roof frame profiles 6, 8 and 10 of the roof module D are in the form of metal sheets in light metal with a shell construction. Here these metal sheets are made from a light metal, preferably magnesium or a magnesium alloy. The components of the body structure K or the first body element are conventionally made of steel. In the exemplary embodiment shown the body pillars 12, here in the form of a B-pillar and a C-pillar, are designed as integral components of the body side wall 2.

Figure 2:
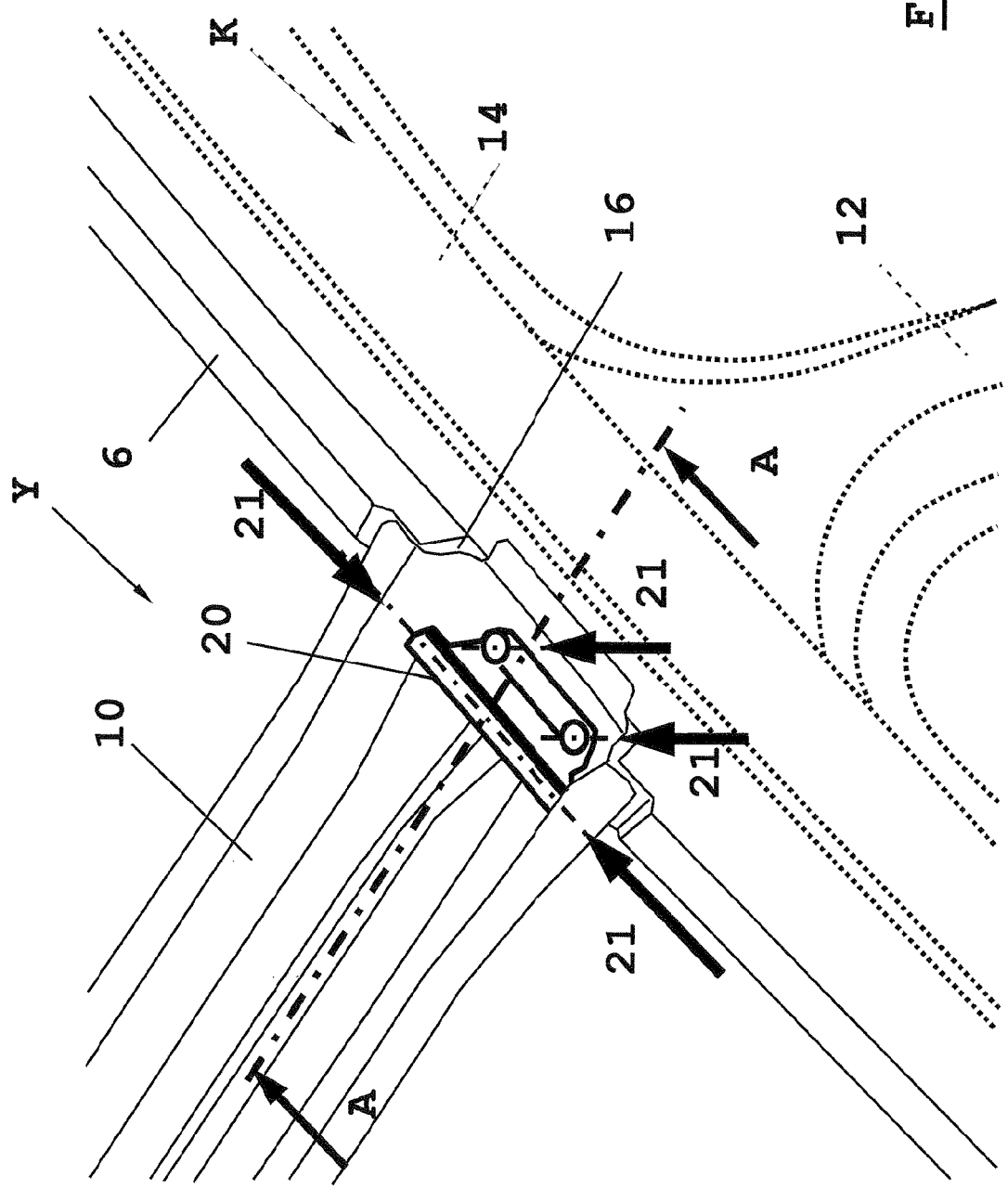
FIG. 2 is a detail enlargement of a connection area Y, in which the body pillars are joined mechanically with parts of the vehicle roof, according to FIG. 1.

FIG. 2 shows an enlargement of the connection area Y according to FIG. 1. This clearly shows how the metal sheet, with a shell design, of the roof cross profile 10 has a substantially U-shaped cross-section and in the connection area Y is embedded in a recess 16 of a roof frame longitudinal profile 6 adapted to the section of the roof frame cross profile 10. Advantageously the roof frame cross profiles 8 and 10 and the roof frame longitudinal profile 6 are already joined together (e.g. glued, welded, soldered or similar) in a pre-assembled roof frame module D. This pre-assembled roof frame module D is then placed on the body structure K, positioned and then by means of mechanical connecting means 20 mechanically joined to the body structure K. For this, the connecting means 20, which in this case have a two-part design, along with a first connecting element 20a are inserted in the connection area Y in the room frame cross profile 10 with a shell structure and positioned or fixed there. The first connecting element 20a seen in cross-section has a substantially L-shaped design, wherein with its short arm 20a1 on the floor-side it is arranged in the recess 16. The long arm 20a2 of the first connecting element 20a at its free end has in the present case, seen in cross-section, a circular thickened section, which in the form and function of a so-called support element 20a3 constitutes a reinforcement of the body structure in the connection area Y. The first connection element 20a is joined by means of securing means 21 (shown here by the two arrows pointing to the floor side and the two laterally pointing arrows)—in particular in the form of a screwed connection—to a second connecting element 20b arranged externally from the floor-side in the recess 16, and in the present case already welded to the body pillar 12.

Figure 3:
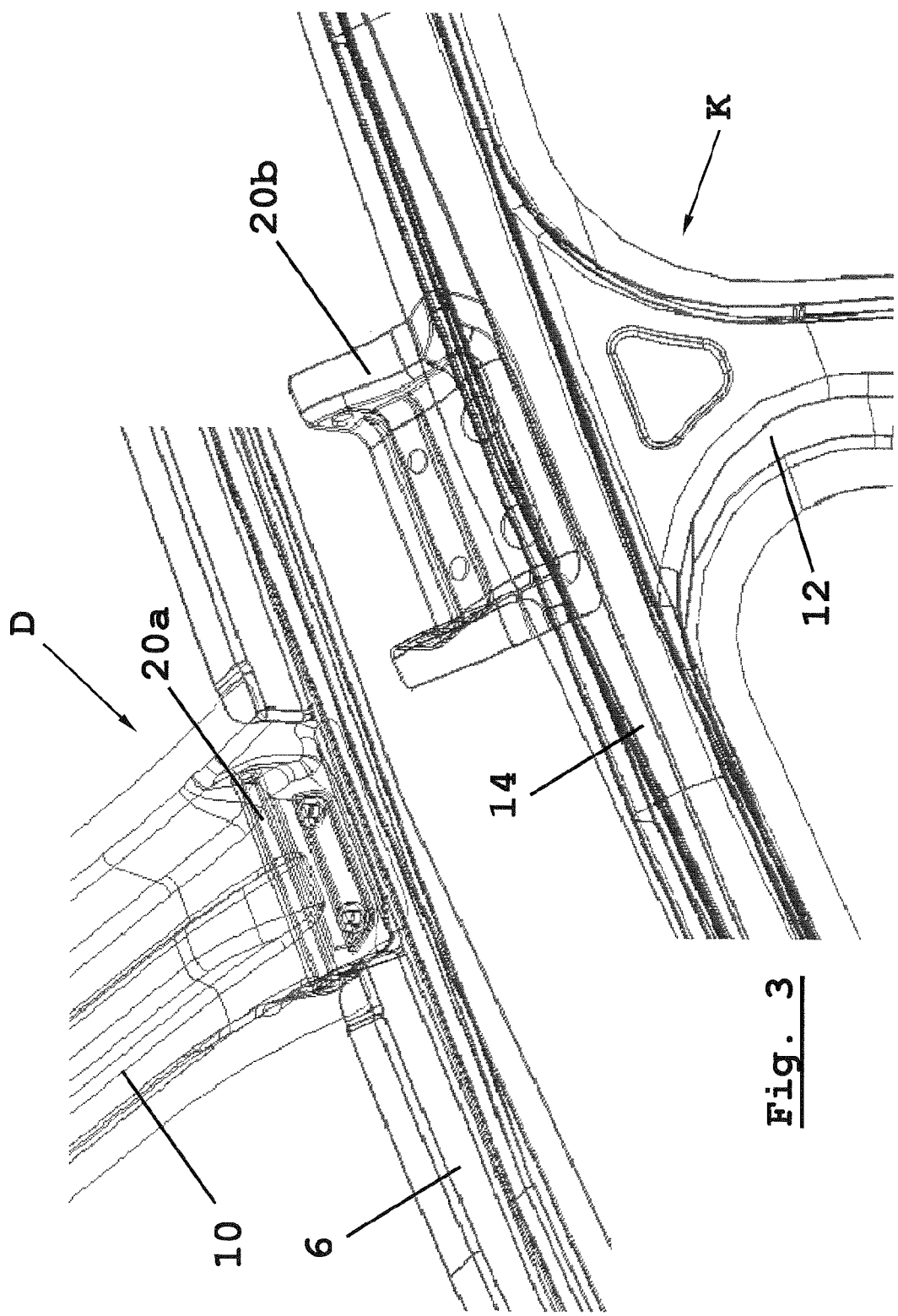
FIG. 3 is the detail enlargement according to FIG. 2 in an exploded view of the roof frame and body structure.

FIG. 3 shows the detail enlargement of the connection area Y according to FIG. 2 in an exploded view of the roof frame or roof module D and body structure K. This representation shows firstly how the two body elements (body structure K and roof module D), which in each case are assigned to a connecting element 20a, 20b, are designed as separate and in part pre-assembled components, and secondly that the second connecting element 20b is designed as a shell component which is arranged below the recess 16 or is welded to the body structure K in the area of the body pillar 12.

Figure 4:
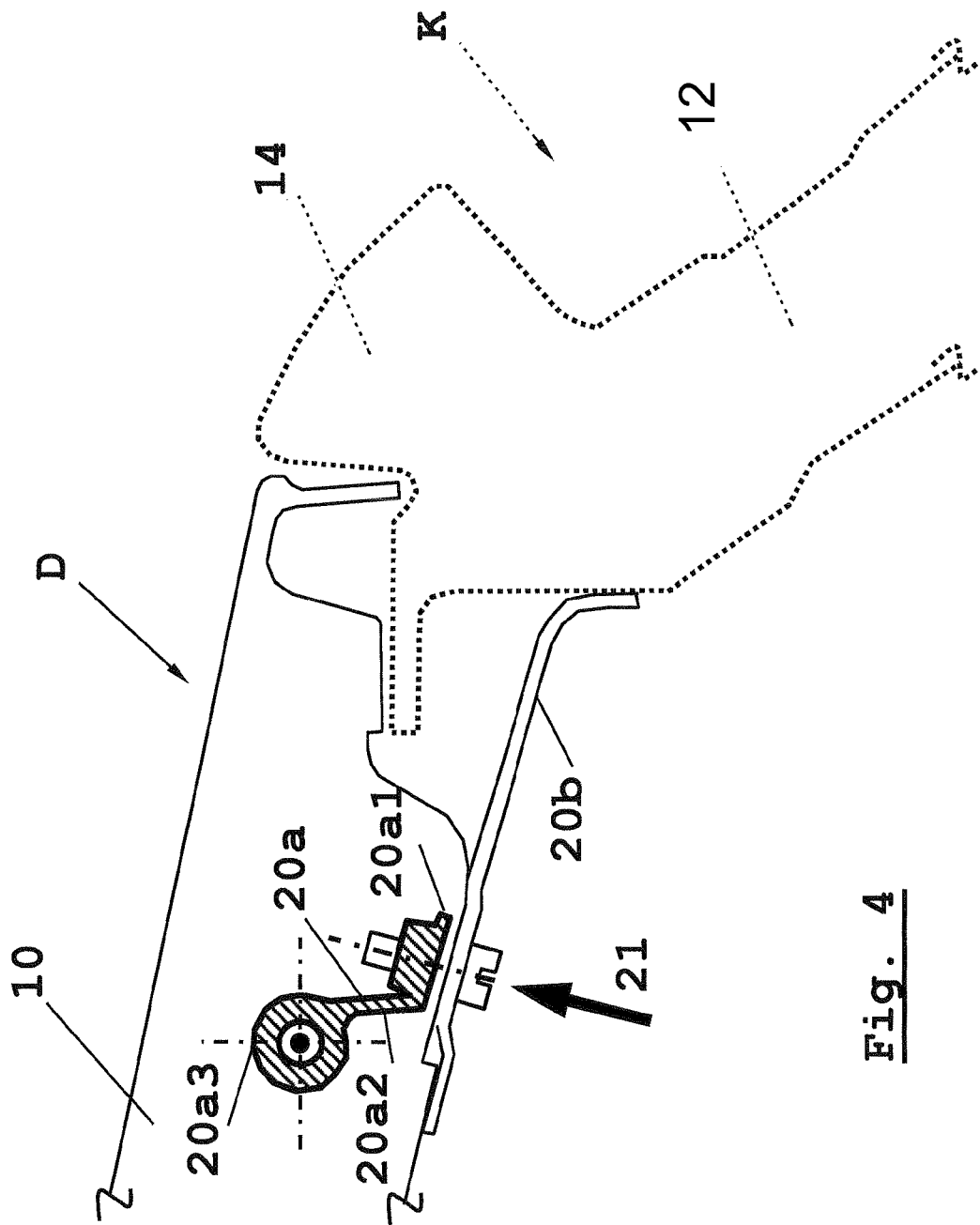
FIG. 4 is a sectional representation of the connection area Y according to FIG. 2.

In FIG. 4 the connection area Y is shown in a sectional representation along the line A-A (FIG. 2). This shows how the pre-assembled roof frame module D is placed and retained on profile sections of the roof frame longitudinal profile 14 on the body side. A further support is provided for the roof frame module D in the area of the connection points Y by the second connecting elements 20b already welded to the body K. The first connecting element 20a pre-positioned in the roof cross profile 10 is now mechanically joined via the connecting means 21 to the body structure K. In the exemplary embodiment shown, the first connecting element 20a is screwed by means of two floor-side connecting means 21 and two further connecting means 21 in the area of the side walls of the recess 16 with the second connecting element 20b.

By means of the mechanical connecting means 20 in a particularly advantageous manner the roof frame consisting of a light metal (preferably magnesium) is connected to a body pillar 12, in particular a B-pillar, which as a rule consists of high-strength to super-high-strength steel. Through the additional support function of the connecting means 20 an extremely crash-safe connection between roof frame module D and body structure K can be achieved. Through the additional bend protection provided by the support element 20a3 in the area of the body pillars 12 the stability of the body as a whole can be considerably improved.

The following exemplary embodiments according to the invention are likewise included in the scope of disclosure of the application documents:

The exemplary embodiment relates to a body for a motor vehicle, comprising two roof frame longitudinal profiles (6, 14), at least one roof frame cross profile (10) arranged between the roof frame longitudinal profiles (6, 14), and at least one body pillar (12), wherein in a connecting area (Y), a roof frame longitudinal profile (6, 14), a roof frame cross profile (10) and the body pillar (12) are connected or can be connected together using a mechanical connecting means (20), wherein the roof frame longitudinal profile (6; 14) in the connection area (Y) seen in the longitudinal section of the roof frame longitudinal profile (6; 14) has a recess (16) for accommodating the roof frame cross profile (10) which in its circumferential contour is at least in part adapted to the recess (16), and the connecting means (20) at least with parts in the roof frame cross profile (10) is arranged in the area of the recess (16) and designed so that the two opposing side walls of the roof frame cross profile (10) in the area of the recess (16) are supported against each other.

An exemplary feature is that the roof frame cross profile (10) and/or the roof frame longitudinal profile (6) consists or consist of a material having a modulus of elasticity which is less than the modulus of elasticity of the body pillar (12).

Another exemplary feature is that the roof from longitudinal profile (6) and/or the roof frame cross profile (10) consists or consist of the material magnesium or a magnesium alloy.

Another exemplary feature is that the roof frame profiles (6, 10) are in the form of components of a multi-part roof frame module (D) that is pre-assembled or can be pre-assembled.

Another exemplary feature is that the body pillar (12) consists of steel or a steel alloy.

Another exemplary feature is that the body pillar (12) is designed as an integral component of a body element having further components of a vehicle body.

Another exemplary feature is that the roof frame cross profile (10) and/or the roof frame longitudinal profile (6; 14) takes or take the form of sheet metal with a shell construction.

Another exemplary feature is that the connecting means (20) comprise a first connecting element (20a) and a second connecting element (20b) cooperating with this.

Another exemplary feature is that the second connecting element (20b) is welded to the body pillar (12).

Another exemplary feature is that the first connecting element (20a) in the roof frame cross profile (10) is arranged in the area of the recess (16) and has support means (20a3) via which the opposing inner side walls of the roof frame cross profiles (10) in the area of the recess (16) are supported against each other, and-the second connecting element (20b) is designed so that on the floor side it encloses the side walls of the roof frame longitudinal profile (6; 14) with a U-shape seen in a longitudinal section in the area of the recess (16), wherein in the area of the opposing side walls it has openings on both sides which correlate with openings of the support means (20a3) of the first connecting element (20a), such that the two connecting elements (20a, 20b) are connected or can be connected together enclosing the first body element via an additional securing means (21).

A method for producing the exemplary embodiment comprises the method steps:

provision of a first body element, wherein this is in the form of a roof frame module (D) with roof frame longitudinal profiles (6) and roof frame cross profiles (10), and wherein the roof frame longitudinal profile (6) in the connection area (Y) of the roof frame profiles (6; 10), seen in the longitudinal section of the roof frame longitudinal profile (6) has a recess (16) for accommodating the roof frame cross profile (10) that is at least in some areas of its circumferential contour adapted to the recess (16), provision of a second body element, wherein this is in the form of a body pillar (12) or a body part with integrated body pillar (12), provision of a multi-part connecting means (20) and form and force-fit connection of the first and second body element via the connecting means (20), wherein via a support element (20a3) of the connecting means (20) a support for the inner side walls of the roof frame cross profiles (10) in the area of the recess (16) is ensured.

Another exemplary feature is that the form and force-fit connection of the first and second body elements is achieved, inasmuch as in the connection area (Y), in which the roof frame profiles (6;10) of the first body element are connected together, in the roof frame cross profile (10) in the area of the recess (16) a first connecting element (20a) is arranged and fixed, which firstly is supported via the support element (20a3) on the side walls in the area of the recess (16) and which secondly is supported on the floor-side in the recess (16), and wherein on the second body element, in the head end area of the body pillar (12) a second connecting element (20b) is arranged and fixed, and the two connecting elements (20a, 20b) are connected together with a form and force-fit via securing means (21) enclosing the first body element.

The invention claimed is:

1. Body for a motor vehicle, comprising
   two laterally spaced roof frame longitudinal profiles,
   at least one roof frame cross profile arranged between the roof frame longitudinal profiles, and
   at least one B- or C-pillar,
   wherein in a connecting area, a roof frame longitudinal profile, a roof frame cross profile and B- or C-pillar are connected together using a mechanical connecting means,
   wherein the roof frame longitudinal profile in the connecting area seen in the longitudinal section of the roof frame longitudinal profile has a recess for accommodating the roof frame cross profile which in a circumferential contour thereof is at least in part adapted to the recess, and
   wherein the connecting means at least with parts in the roof frame cross profile is arranged in the area of the recess and designed so that two opposing side walls of the roof frame cross profile in the area of the recess are supported against each other; and
   wherein the connecting means comprises a first connecting element and a second connecting element:
      the first connecting element having a first portion and a second portion, the first portion comprising an elongated collar having a constant cross sectional area that is arranged in the area of the recess between the opposing inner side walls of the roof frame across profiles such that the opposing inner sidewalls are supported against each other, the second portion comprising an extension extending away from the collar;
      the second connecting element comprising a bottom wall and opposing sidewalls extending upwardly from the bottom wall;
      wherein the opposing sidewalls of the second connection element at least partially overlap the two opposing sidewalls of the roof frame cross profile such that the second connecting element is joined to the collar of the first connecting element and the two opposing sidewalls of the roof frame cross profile are interposed, respectively, between opposing ends of the collar and the opposing sidewalls of the second connecting element; and
      wherein the bottom wall of the second connecting element is joined to the second portion first connecting element.

2. Body according to claim 1, characterised in that at least one of the roof frame cross profile and the roof frame longitudinal profile consist of a material having a modulus of elasticity which is less than the modulus of elasticity of the B- or C-pillar.

3. Body according to claim 1 characterised in that at least one of the roof frame longitudinal profile and the roof frame cross profile consists of the material magnesium or a magnesium alloy.

4. Body according to claim 1 characterised in that the longitudinal roof frame profile and roof frame cross profiles are in the form of components of a multi-part roof frame module that is pre-assembled or can be pre-assembled.

5. Body according to claim 1 characterised in that the B- or C-pillar consists of steel or a steel alloy.

6. Body according to claim 1 characterised in that the B- or C-pillar is designed as an integral component of a body element having further components of a vehicle body.

7. Body according to claim 1, characterised in that at least one of the roof frame cross profile and the roof frame longitudinal profile takes the form of sheet metal with a shell construction.

8. Body according to claim 1, characterised in that the second connecting element is welded to the B- or C-pillar.

9. The body of claim 1, wherein the recess does not form an end of the roof frame longitudinal profile.

10. The body of claim 9, wherein the B- or C-pillar forms a substantially T-shape at the connection area with the roof frame longitudinal profile and the roof frame cross profile and roof frame longitudinal profile form a T-shape at the connection area such that at least four portions extend from the connection area.

11. The body of claim 1, wherein the recess is defined entirely by the roof frame longitudinal profile in the connecting area.

12. Method for producing a body for a motor vehicle comprising the method steps:
   provision of a first body element, wherein this is in the form of a roof frame module with laterally spaced roof frame longitudinal profiles and roof frame cross profiles, and wherein the roof frame longitudinal profile in a connection area seen in the longitudinal section of the roof frame longitudinal profile has a recess for accommodating the roof frame cross profile that is at least in some areas of a circumferential contour thereof adapted to the recess, wherein the roof frame cross profile has opposing inner sidewalls,
   provision of a second body element, wherein this is in the form of a body pillar or a body part with integrated body pillar,
   provision of a multi-part connecting means comprising a first connecting element and a second connecting element, the first connecting element having a first portion and a second portion, the first portion comprising an elongated collar having a constant cross sectional area, the second portion comprising an extension extending away from the collar, the second connecting element comprising a bottom wall and opposing sidewalls extending upwardly from the bottom wall;

form and force-fit connection of the first and second body element via the connecting means, wherein via a support element of the connecting means a support for the inner side walls of the roof frame cross profiles in the area of the recess is ensured by at least partially overlapping the opposing inner sidewalls of the roof frame cross profile with the opposing sidewalk of the second connecting element, joining the second connecting element to the first connecting element such that the two opposing sidewalk of the roof frame cross profile are interposed, respectively, between opposing ends of the collar and the opposing sidewalls of the second connecting element and wherein the bottom wall of the second connecting element is joined to the second portion of the first connecting element.

13. The method of claim 12, wherein the body pillar is a B- or C-pillar.

* * * * *